May 24, 1932.     R. DEMING     1,860,238
SPIRAL GAS AND OIL SEPARATOR
Original Filed April 11, 1929
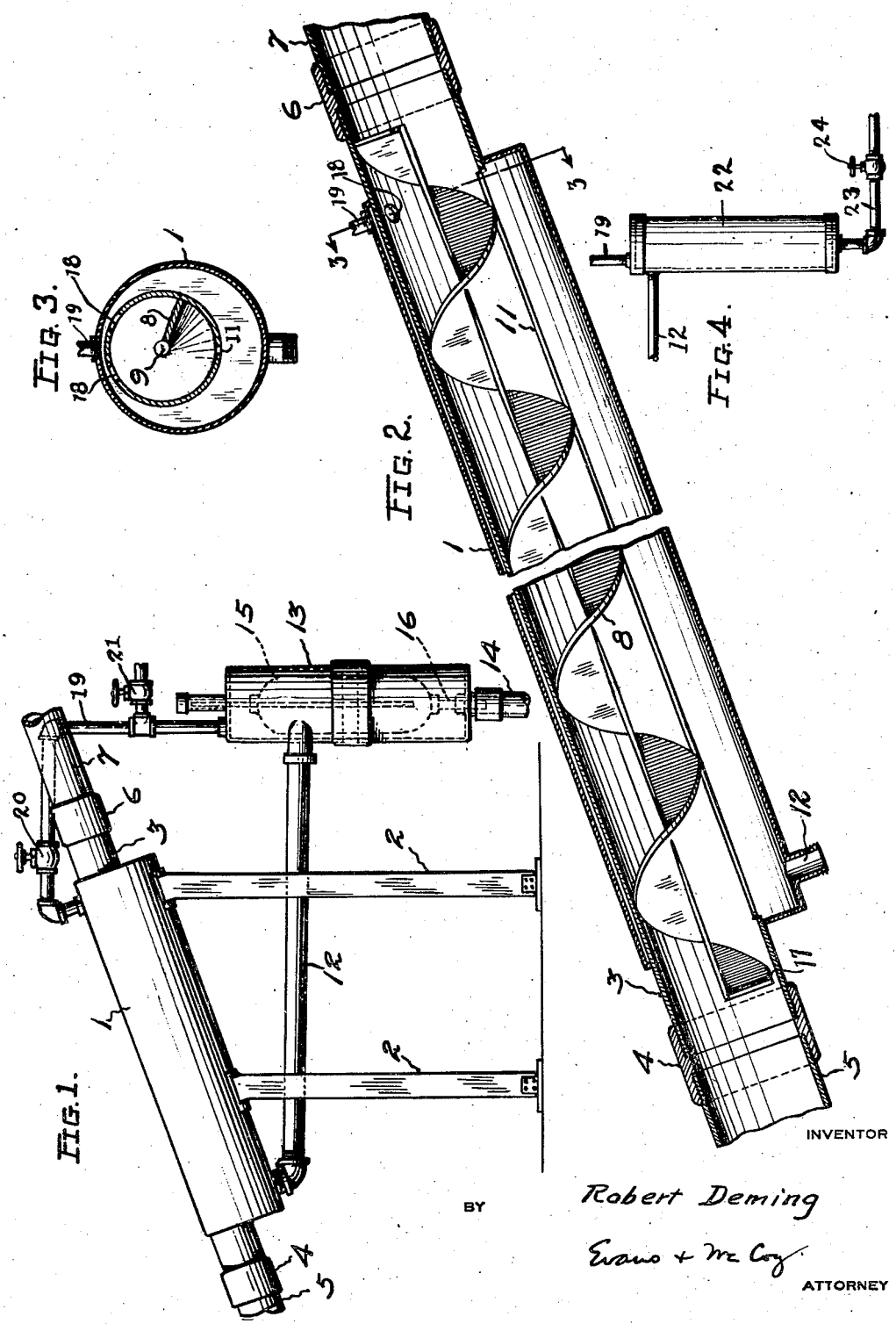
INVENTOR
Robert Deming
BY
Evans + McCoy
ATTORNEY Patented May 24, 1932

1,860,238

UNITED STATES PATENT OFFICE

ROBERT DEMING, OF CINCINNATI, OHIO

SPIRAL GAS AND OIL SEPARATOR

Application filed April 11, 1929, Serial No. 354,276. Renewed October 21, 1931.

This invention relates to separators for separating and separately discharging liquid and gas from a conduit through which liquid and gas are being delivered and particularly to separating devices capable of freeing a gas stream from liquid held in suspension in the gas.

The present invention, while of quite general application for separating liquids from gas, is particularly useful in connection with oil and gas wells in which the gas is discharged from the well and carries varying quantities of liquid with it.

The present invention has for an object to provide a separator which is capable of freeing the gas from liquid without impeding the flow of gas and without leakage of gas from the conduit.

A further object is to provide a separator which is of simple and rugged construction, which occupies a small amount of space and which can be easily and quickly connected in a pipe line.

A further object is to utilize the velocity of the gas to impart a whirling motion to the stream of gas and liquid so as to cause the liquid to collect along the wall of the conduit and to provide means for conducting the liquid from the conduit without permitting leakage of gas.

With the above and other objects in view, the invention may be said to comprise the device as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of the specification in which:

Figure 1 is a side elevation showing the separator and liquid discharge device embodying the invention.

Fig. 2 is a longitudinal section through the separator.

Fig. 3 is a section taken on the line indicated at 3—3 in Fig. 2.

Fig. 4 shows a modified form of liquid discharge chamber.

As shown in the accompanying drawings, the separator comprises an elongated tubular casing 1 which is supported upon suitable standards 2, preferably in a position in which its axis is inclined with respect to the horizontal. A pipe 3 of smaller diameter than the casing 1 extends longitudinally through the casing and the ends of the casing have a fluid tight connection with the pipe. The pipe 3 is adapted to form a section of the conduit through which the gas and liquid mixture flows and the lower end thereof may be connected by means of a coupling 4 to a pipe 5 which may be connected to a gas or oil well or any pipe line through which the liquid and gas is delivered. The upper end of the pipe 3 is adapted to be connected by means of a coupling 6 with a discharge pipe 7 which may lead to a gas storage tank or gas main.

Within the pipe 3 and extending substantially throughout the length thereof, there is a spiral vane 8 which has its outer edge abutting and secured to the wall of the conduit. The vane 8 is of a width slightly less than the internal radius of the conduit so that its inner edge is spaced outwardly a short distance from the longitudinal axis of the conduit providing a direct axial passageway 9 through which gas may flow in a straight line from one end of the vane to the other through the pipe 3 from the inlet to the outlet of the separator.

The vane 8 serves to impart a whirling motion to the stream of gas and liquid flowing through the separator and the whirling motion serves to throw liquid present in the gas stream by centrifugal force against the wall of the conduit, causing the liquid to collect on the wall while the gas passes on through the separator.

The liquid collecting on the wall of the conduit flows by gravity toward the bottom of the conduit and through an elongated slot 11 into the elongated casing 1 surrounding the conduit. The slot 11 extends longitudinally of the conduit along the bottom thereof substantially throughout the entire length of the casing 1 so that liquid will be drained from the conduit substantially throughout the entire length of the vane. With the casing 1 inclined with respect to the horizontal, liquid will flow by gravity toward the lower end of the casing and any gas entering the casing escapes into the conduit adjacent the discharge end of the separator.

A liquid discharge conduit 12 is connected to the lower end of the casing 1 to discharge liquid collecting in the chamber. In gas and oil wells, there is usually a considerable variation in the proportion of gas and liquid delivered from the well and also considerable fluctuation in the pressure at which the gas and liquid is delivered. The liquid discharge conduit must be of sufficient capacity to take care of the maximum flow of liquid and, if this flow is decreased, some of the gas would normally escape through the liquid discharge conduit.

In order to avoid this loss of gas, means is provided in connection with the liquid discharge conduit for maintaining at all times a liquid seal to prevent escape of gas through this conduit. This means comprises a chamber 13 into which the conduit 12 discharges and this chamber is provided at its lower end with an outlet 14 through which the liquid is discharged. The conduit 12 delivers into the upper portion of the chamber 13 and the chamber contains a float 15 which carries a valve 16 which opens and closes the outlet 14. When the chamber 13 contains a sufficient liquid to raise the float 15, the valve 16 is lifted from its seat and liquid is permitted to flow from the chamber. Whenever the level of the liquid in the chamber 13 is lowered sufficiently to cause the valve to engage its seat, the outlet 14 is closed and, when there is sufficient liquid in the chamber 13 to open the valve 16, this liquid provides an effective seal against escape of gas while liquid is flowing through the outlet 14.

If there are fluctuations in the rate of flow of liquid, the float controlled valve will automatically regulate the discharge of liquid and prevent the liquid from discharging at a rate sufficient to break the seal, so that escape of gas with the liquid from the separator is at all times prevented.

As shown in Fig. 2 of the drawings, the outer edge of the spiral vane adjacent its lower end is spaced from the bottom of the pipe 3 to provide an opening 17 through which any liquid flowing along the bottom of the pipes 5 and 3 may flow freely along the wall of the pipe to the lower end of the slot 11. Thus, if a portion of the liquid has become separated from the gas before coming to the separator, this liquid will flow directly to the lower end of the slot 11 and pass to the discharge conduit 12.

At the upper end of the separator, the pipe 3 has a plurality of openings 18 which have a total cross sectional area greater than the cross sectional area of the elongated slot 11 so that there is a free outlet for any gas entering in the liquid receiving chamber. The provision of the openings 18 prevents the development of a gas pressure in the outer chamber particularly in the upper end thereof sufficiently high to impede the flow of liquid through the slot 11 and makes the slot 11 effective as a drain passage throughout its length so that effective separation of gas and liquid may be effected in a chamber of considerably less length than would otherwise be necessary.

In order to prevent the creation of a gas pressure in the float chamber 13 which would interfere with the operation of the float valve, the pressure in the top of the chamber 13 is equalized with the pressure in the upper end of the separator by means of a pipe 19 extending from the upper end of the separator to the top of the float chamber.

The pipe 19 is provided with a cut-off valve 20 and a blow-off valve 21. The valve 20 is normally open and the valve 21 is normally closed so that the float chamber is in communication with the separator chamber. The valve 20 may be closed and the valve 21 opened to direct the full pressure head through the float chamber for cleaning purposes.

If only a small amount of liquid is being delivered with the gas from the wall, it is unnecessary to provide an automatic valve controlling the escape of liquid. As shown in Fig. 4 of the drawings, the pipe 12 may deliver into the upper end of a tank 22 which replaces the float chamber 13, the tank 22 being connected to the pipe 19 leading to the upper end of the separator and having an outlet 23 controlled by a manually operable valve 24. Liquid separated from the gas is delivered through the pipe 12 to the tank 22 and accumulates therein, the valve 24 being opened manually to drain liquid from the tank as often as may be necessary.

In the operation of the separator, the gas is permitted to flow freely through the separator and on through the line while the liquid, by reason of its greater weight is thrown against the wall of the separator chamber and flows out through the slot 11. By reason of the decrease in weight of the fluid stream by the separation of the liquid, the velocity of the stream is increased in passing through the separator, so that the discharge of fluid through the line is accelerated by the action of the separator.

It will be apparent that the present invention provides a very simple and effective device for separating the liquid from a gas stream so that the gas may be delivered direct into a gas main or storage chamber and that separation of the gas and liquid is accomplished in such manner as to accelerate the rate of flow of the gas and liquid from the well and without loss of gas.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A device for separating liquids from gases comprising an elongated tubular casing, a conduit through which a mixture of gas and liquid flows, said conduit extending longitudinally through the casing and being in communication with the interior of the casing substantially throughout the length thereof, means in the portion of the conduit communicating with the casing for imparting a whirling motion to the stream of gas and liquid flowing through the conduit, said means being spaced outwardly from the axis of the conduit and said conduit being unobstructed inwardly of said means so that an open axial passageway through the separator is provided, an outlet for discharging liquid from said casing, and means associated with the outlet for preventing escape of gas with the liquid.

2. A device for separating liquids from gases comprising a conduit through which a mixture of liquid and gas flows, a spiral vane in said conduit having its outer edge contiguous to the wall of the conduit and its inner edge spaced from the axis of said conduit to provide a direct unobstructed axial passageway through the separator, a liquid receiving chamber extending along the portion of the conduit containing the spiral vane and in communication substantially throughout its length with the interior of the conduit, said chamber having an outlet for liquid, and means associated with the outlet for preventing escape of gas with the liquid.

3. A device for separating liquids from gases comprising an elongated tubular casing supported at an inclination to the horizontal, a conduit through which a mixture of gas and liquid flows, said conduit extending longitudinally through said casing and having an elongated slot in its lower side within said casing, a spiral vane in the conduit within said casing, said vane having its outer edge contiguous to the wall of the conduit and its inner edge terminating short of the axis of the conduit to provide a direct unobstructed axial passageway through the separator, and an outlet for liquid adjacent the lower end of the casing.

4. A device for separating liquids from gases comprising an elongated tubular casing supported at an inclination to the horizontal, a conduit through which a mixture of gas and liquid flows, said conduit extending longitudinally through the casing and being in communication along its under side with the interior of the casing substantially throughout the length thereof, means in the portion of the conduit communicating with the casing for imparting a whirling motion to the gas and liquid stream, said means being spaced outwardly from the axis of the conduit whereby an unobstructed axial passageway through the separator is provided, and a liquid discharge conduit communicating with the casing adjacent its lower end.

5. A device for separating liquids from gases, comprising an elongated tubular casing supported at an inclination to the horizontal, a conduit through which a mixture of gas and liquid flows, said conduit extending longitudinally through said casing and having an elongated slot in its lower side within said casing, a spiral vane in the conduit within said casing, said vane having its outer edge contiguous to the wall of the conduit and its inner edge terminating short of the axis of the conduit to provide a direct axial passageway, said vane being spaced from the bottom of the conduit at its lower end to provide a free passage to said slot for liquid flowing along the bottom of the conduit, and an outlet for liquid adjacent the lower end of the casing.

6. A device for separating liquids from gases, comprising an elongated tubular casing supported at an inclination to the horizontal, a conduit through which a mixture of gas and liquid flows, said conduit extending longitudinally through said casing and having an elongated slot in its lower side within said casing, said conduit having openings to the interior of the casing adjacent the upper end thereof to permit gas to escape freely from the upper end of the casing into the conduit, a spiral vane in the conduit within said casing, said vane having its outer edge contiguous to the wall of the conduit and its inner edge terminating short of the axis of the conduit to provide an unobstructed axial passageway through the separator, an outlet for liquid adjacent the lower end of the casing, and means associated with said outlet for preventing escape of gases with the liquid.

7. A device for separating liquids from gases, comprising an elongated tubular casing supported at an inclination to the horizontal, a conduit through which a mixture of gas and liquid flows, said conduit extending longitudinally through said casing and having an elongated slot in its lower side within said casing, said conduit having openings to the interior of the casing adjacent the upper end thereof to permit gas to escape freely from the upper end of the casing into the conduit, said opening having a total cross sectional area greater than the cross sectional area of the slot, a spiral vane in the conduit within said casing, said vane having its outer edge contiguous to the wall of the conduit and its inner edge terminating short of the axis of the conduit to provide a direct axial passageway, an outlet for liquid adjacent the lower end of the casing, and means associated with said outlet for preventing escape of gases with the liquid.

In testimony whereof I affix my signature.

ROBERT DEMING.